United States Patent [19]
Craft et al.

[11] Patent Number: 5,931,182
[45] Date of Patent: Aug. 3, 1999

[54] PRESSURE REDUCING VALVE

[75] Inventors: Roger L. Craft; James V. Mascola, both of Emporia, Kans.

[73] Assignee: Vektek, Inc., Emporia, Kans.

[21] Appl. No.: 09/116,829

[22] Filed: Jul. 16, 1998

[51] Int. Cl.$^6$ .................................................. G05D 16/02
[52] U.S. Cl. ................. 137/116.5; 137/505; 137/505.25; 137/599.2
[58] Field of Search ................................ 137/116.5, 505, 137/599.2, 505.25, 505.11

[56] References Cited

U.S. PATENT DOCUMENTS

| | | |
|---|---|---|
| 1,897,432 | 2/1933 | Klotzman . |
| 2,522,913 | 9/1950 | Westman . |
| 2,665,704 | 1/1954 | Kanuch ............................. 137/599.2 X |
| 2,687,743 | 8/1954 | Huber . |
| 2,731,975 | 1/1956 | Boals . |
| 2,984,252 | 5/1961 | Bryant . |
| 3,068,883 | 12/1962 | Brumm . |
| 3,211,175 | 10/1965 | Replogle ........................ 137/505.11 X |
| 3,348,573 | 10/1967 | Bradford . |
| 3,685,533 | 8/1972 | Krechel . |
| 4,194,522 | 3/1980 | Lucas et al. . |
| 4,432,385 | 2/1984 | Legris .............................. 137/599.2 X |

*Primary Examiner*—Stephen M. Hepperle
*Attorney, Agent, or Firm*—Hovey,Williams, Timmons & Collins

[57] ABSTRACT

A pressure reducing valve assembly (10) includes an elongated tubular body (12), a pressure reducing valve (16) for reducing the fluid pressure discharged from the valve assembly, a pressure relief valve (18) for permitting fluid to discharge from the valve assembly when the device to which the valve assembly is coupled experiences an over-pressure condition, and a reset valve (20) for resetting the pressure reducing valve when the fluid pressure on the high pressure side of the valve assembly is reduced below a pre-selected reset level. The pressure reducing valve, pressure relief valve, and reset valve are all positioned within the tubular body and coaxially aligned along the longitudinal axis (14) of the body. The reset valve is positioned within the confines of the pressure reducing valve, and the pressure relief valve utilizes the same compression spring (90) as the pressure reducing valve.

16 Claims, 2 Drawing Sheets

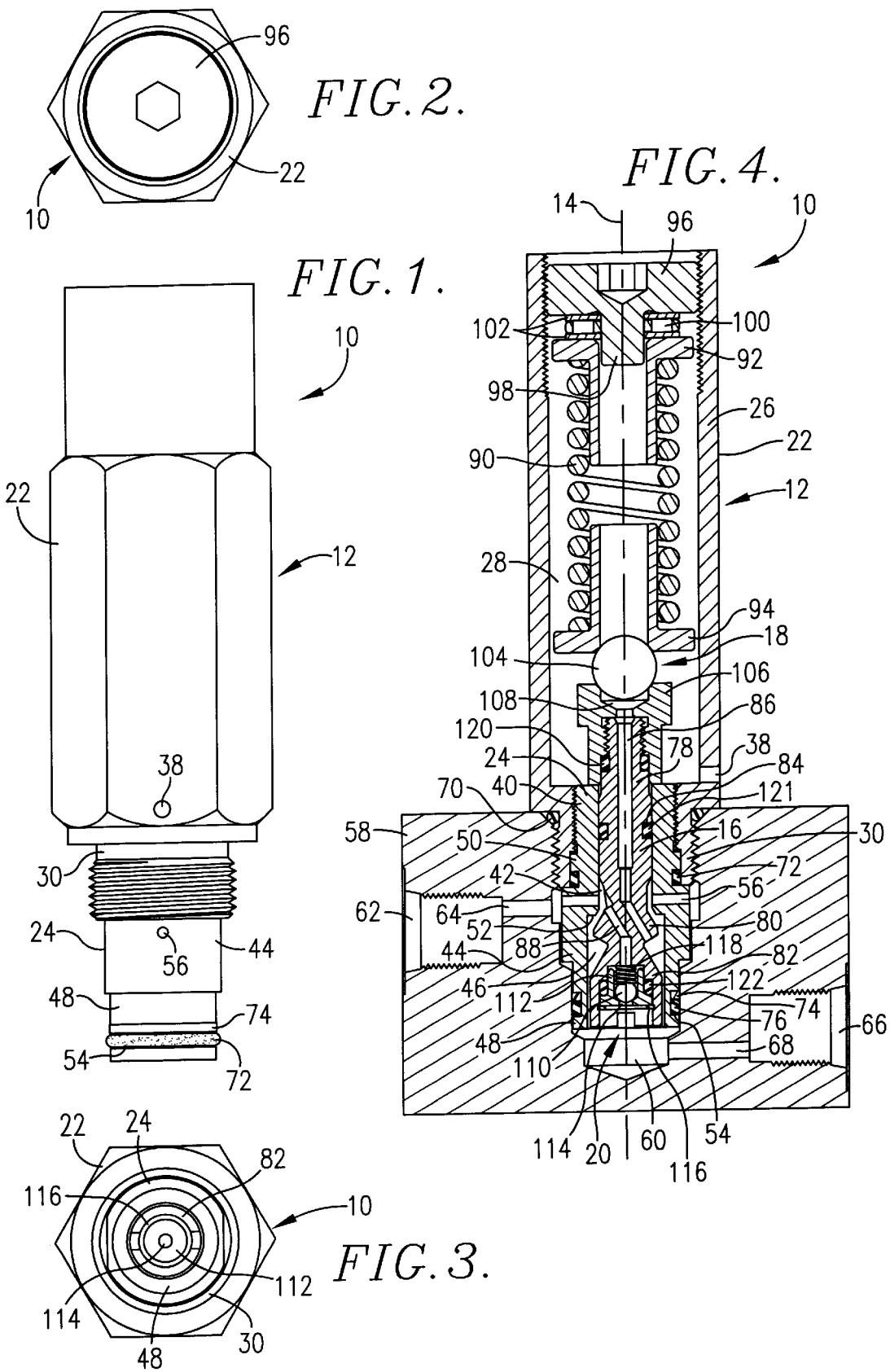

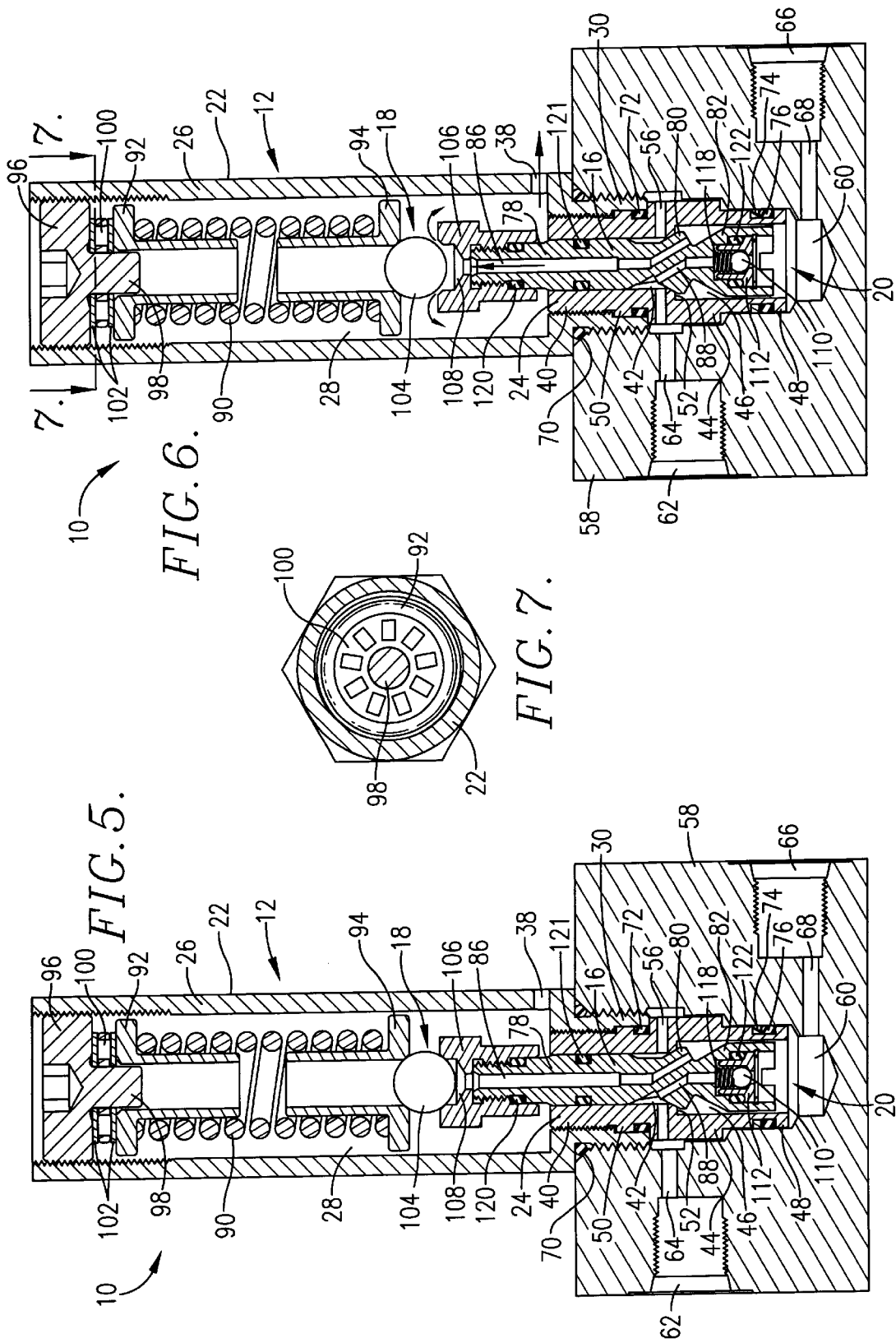

PRESSURE REDUCING VALVE

BACKGROUND OF THE INVENTION

1. Field of the Invention

The present invention relates to pressure reducing valves for reducing the pressure of hydraulic fluid delivered to portions of hydraulic circuits. More particularly, the invention relates to a pressure reducing valve that is more compact and that includes less parts than conventional pressure reducing valves.

2. Description of the Prior Art

Pressure reducing valves are commonly used when it is desired to reduce the maximum fluid pressure delivered to a portion of a hydraulic circuit while maintaining a higher fluid pressure to the remainder of the hydraulic circuit. For example, in hydraulic clamping systems, a pressure reducing valve may be interposed between a hydraulic pump or other source of high pressure fluid and one or more clamps. This reduces the fluid pressure delivered to selected clamps while allowing the remaining clamps to operate at a higher fluid pressure, thus eliminating the need for a separate hydraulic pump for each pressure level used.

A problem with prior art pressure reducing valves is that they are typically bulky and therefore require a great deal of space. This is problematic in applications where space is limited such as in clamping operations where numerous clamps requiring different fluid pressure levels may be mounted to a single fixture.

Another problem with prior art pressure reducing valves is that they are not efficiently designed and therefore include a large number of parts. This not only increases the overall size of the valves, which contributes to the problems described above, but also increases the cost and the complexity of the valves.

OBJECTS AND SUMMARY OF THE INVENTION

The present invention solves the above-described problems and provides a distinct advance in the art of pressure reducing valves by providing a pressure reducing valve assembly that is compact and efficiently designed with a fewer number of parts, some of which are strategically positioned to perform more than one function.

The pressure reducing valve assembly of the present invention broadly includes an elongated tubular body, a pressure reducing valve positioned within the body for reducing the fluid pressure delivered to a device from the valve assembly, a pressure relief valve positioned within the body for permitting fluid to vent out of the valve assembly when the device or hydraulic line to which the valve assembly is coupled experiences an over-pressure condition, and a reset valve positioned within the body for resetting the pressure reducing valve to its open position when the fluid pressure on the high pressure side of the valve assembly is reduced below a pre-selected reset level.

Advantageously, the pressure reducing valve, pressure relief valve, and reset valve are all positioned within the tubular body and coaxially aligned along the longitudinal axis of the body. This construction allows the pressure reducing valve to be reset without the need for a separately mounted reset valve and optimizes the space requirements of the overall valve assembly.

In preferred forms, the reset valve is positioned within the confines of the pressure reducing valve to further reduce the space requirements of the valve assembly. Moreover, the pressure relief valve utilizes some of the same components as the pressure reducing valve to reduce the total number of parts of the valve assembly, further reducing the size and decreasing the cost and complexity of the valve assembly.

BRIEF DESCRIPTION OF THE DRAWING FIGURES

A preferred embodiment of the present invention is described in detail below with reference to the attached drawing figures, wherein:

FIG. 1 is an elevational view of a pressure reducing valve assembly constructed in accordance with a preferred embodiment of the present invention;

FIG. 2 is a top view of the valve assembly shown in FIG. 1;

FIG. 3 is a bottom view of the valve assembly shown in FIG. 1;

FIG. 4 is a vertical section view of the valve assembly shown mounted to a base and illustrated with its pressure reducing valve in its open position and the pressure relief valve and reset valve in their closed positions;

FIG. 5 is a vertical section view of the valve assembly shown mounted to the base and illustrated with the pressure reducing valve, the pressure relief valve, and the reset valve all in their closed positions;

FIG. 6 is a vertical section view of the valve assembly shown mounted to the base and illustrated with the pressure reducing valve in its closed position, the pressure relief valve in its open position, and the reset valve in its closed position; and FIG. 7 is a section view taken along line 7—7 of FIG. 6.

DETAILED DESCRIPTION OF THE PREFERRED EMBODIMENTS

Turning now to the drawing figures, and particularly FIG. 4, a pressure reducing valve assembly 10 constructed in accordance with a preferred embodiment of the invention is illustrated. The valve assembly broadly includes an elongated tubular valve body 12 having a longitudinal axis 14, and a pressure reducing valve 16, a pressure relief valve 18, and a reset valve 20 all mounted within the body along the longitudinal axis 14 of the body.

In more detail, the body includes mating, threadably coupled upper and lower body sections 22,24. The upper body section is generally tubular in shape and includes a sidewall 26 defining an enlarged central bore 28 and a reduced diameter downwardly extending stem 30. A vent port 38 is formed through the sidewall near the bottom of the central bore to connect the central bore to atmosphere or to a fluid return line. Internal threading is formed in the top of the sidewall and in the top of the stem and external threading is formed on the outside of the stem.

The lower body section 24 is also generally tubular in shape and includes an upper portion 40 defining an upper bore 42, an enlarged diameter midsection 44 defining a relatively larger lower bore 46, and a lower portion 48 also defining the bore 46. External threading is formed on the outer wall of the upper portion to threadably couple the lower body section within the stem 30 of the upper body section 22 as illustrated.

The lower body section 24 also includes an annular flange 50 extending radially outward from the upper portion 40 slightly above the large diameter midsection 44. An inwardly projecting shoulder 52 formed by the transition between the upper bore 42 and the enlarged lower bore 46 forms an annular valve seat for the pressure reducing valve 16 as described in more detail below. The lower portion 48 of the lower body section includes an annular cut-out region 54 near its lowermost edge.

Four horizontally extending fluid channels 56 (only two being shown) are formed through the enlarged diameter midsection 44 to connect with the upper and lower bores 42,46 and together form a high pressure port for the valve assembly 10. The bottom of the lower body section 24 is open-ended to define a low pressure port for discharging fluid out of the valve assembly 10 as described in more detail below.

As illustrated in FIGS. 4, 5, and 6, the valve assembly 10 is preferably attached to a base 58 having a recess 60 into which the stem 30 of the upper body section 22 and the entire lower body section 24 are received and into which the stem is threaded. The base includes an inlet port 62 and fluid passageway 64 that are in fluid communication with the four fluid channels 56 and an outlet port 66 and fluid passageway 68 that are in fluid communication with the bottom of the recess 60 and the open end of the lower body section. The inlet and outlet ports include internal threading for connecting with externally threaded high pressure and low pressure lines, respectively, as described in more detail below.

To prevent fluid leakage between the valve assembly 10 and the base 58, O-rings or other types of seals 70, 72, 74,76 are positioned between the stem 30 of the upper body section 22 and the top of the base, between the flange 50 of the lower body section 24 and the enlarged diameter midsection 44, and in the cutout section 54 of the lower body section, respectively.

In accordance with the present invention, the pressure reducing valve 16, pressure relief valve 18, and reset valve 20 are all mounted within the upper and lower body sections 22,24 and are aligned along the longitudinal axis 14 of the valve body 12. This construction optimizes the space requirements of the overall valve assembly 10 and permits sharing of parts between the three valves 16,18,20 as described below.

The pressure reducing valve 16 is mounted within the central bore 28 of the upper body section 22 and the upper and lower bores 42,46 of the lower body section 24 and is operable for reducing the pressure of the fluid discharged from the outlet port 66 relative to the pressure of the fluid received at the inlet port 62. The pressure reducing valve is preferably a poppet-type valve having an elongated stem 78, an enlarged valve head 80 extending radially outwardly from the midsection of the stem, an inverted cup-shaped member 82 depending from the bottom of the stem 30 and a cutout section 84 near the midpoint of the stem. The upper portion of the stem is formed with external threading.

A vertically extending fluid channel 86 extends through the stem 78 between the top of the stem and the bottom of the valve head 80 so that it connects the central bore 28 of the upper body section 22 with the lower bore 46 of the lower body section 24. A relatively shorter vertically extending fluid channel 88 extends through the stem 78 between a point just above the valve head and the interior chamber of the cup-shaped member 82 so that it connects the outlet port 66 with the inlet port 62.

The pressure reducing valve 16 is shiftable within the body 12 between an open position illustrated in FIG. 4 and a closed position illustrated in FIGS. 5 and 6. When in the open position, the valve head 80 is shifted downwardly away from the shoulder 52 so that the pressure reducing valve permits delivery of fluid from the inlet port 62 to the outlet port 66 through the bore 46. When in the open position, the valve head is seated against the shoulder so that the pressure reducing valve prevents fluid from passing from the inlet port to the outlet port.

The pressure reducing valve 16 is biased to its open position by a large compression spring 90 positioned within the central bore 28 of the upper body section 22 that exerts a downward force on the pressure reducing valve through the pressure relief valve 18. The compression spring is sandwiched between a pair of upper and lower spring supports 92,94 and is held in place in the central bore by a cap 96 that is threaded into the upper, open end of the upper body section. The cap includes a downwardly projecting stem 98 that extends into the center of the upper spring support. The cap includes external threading so that it can be threaded into or out of the upper body section to adjust the compression of the spring and therefore the downward force exerted on the pressure reducing valve and pressure relief valve. A needle bearing 100 and a pair of washers 102 may be positioned between the cap and the upper spring support to prevent the spring and spring supports from rotating while the cap is being threaded into or out of the upper body section.

The pressure relief valve 18 is also positioned within the central bore 28 of the upper body section 22 and is operable for discharging fluid out of the vent port 38 when the pressure of the fluid in the outlet port 66 and bore 46 exceeds a pre-determined over-pressure level as described in more detail below. The pressure relief valve is preferably a ball-type valve that includes a ball 104 and a corresponding ball valve seat 106 that is threadably coupled to the top of the stem 78 of the pressure reducing valve 16. The ball is preferably approximately ⅜" in diameter and is formed of delren, nylon, or other suitable material. The valve seat includes a fluid channel 108 that connects the fluid channel 86 formed in the stem 78 of the pressure reducing valve with the central bore 28 of the upper body section 22.

The pressure relief valve 18 is shiftable between an open position illustrated in FIG. 7 and a closed position illustrated in FIGS. 4 and 5. When in the open position, the ball 104 is lifted off of its corresponding valve seat 106 to permit the discharge of fluid from the lower bore 46 of the lower body section 24 through the fluid channel 86 and out the vent port 38 in the upper body section 22 as indicated by the arrows in FIG. 6. When in its closed position, the ball is seated against its valve seat to prevent fluid through the channel 86 and out the vent port.

It is important to emphasize that the ball 104 and corresponding valve seat 106 of the pressure relief valve 18 are sandwiched between the compression spring 90 and the pressure reducing valve 16. Thus, the ball is biased to its closed position by the same compression spring that biases the pressure reducing valve to its open position, eliminating the need for a separate compression spring for the pressure relief valve. This configuration reduces the number of parts required in the valve assembly 10 and contributes to the compactness of the overall valve assembly.

The reset valve 20 is positioned within the cup-shaped member 82 of the pressure reducing valve 16 and is operable for redirecting fluid from the outlet port 66 to the inlet port 62 and to open the pressure reducing valve when the pressure of the fluid delivered to the inlet port drops below a pre-selected reset level as described in more detail below. The reset valve is preferably a ball-type valve that includes a ball 110 and a corresponding ball valve seat 112. The ball is preferably approximately ⅛" in diameter and is formed of steel or other suitable material. The valve seat includes a fluid port 114 that connects the outlet port 66 and lower bore 46 with the fluid channel 88. The ball and valve seat are held in place in the cup-shaped member by a retaining ring 116 as best illustrated in FIG. 3.

The reset valve 20 is shiftable between an open position (not shown) and a closed position illustrated in FIGS. 4, 5, and 6. When in its open position, the ball 110 is lifted upwardly off its valve seat 112 to permit the passage of fluid from the outlet port 66, through the fluid channel 88, and out the inlet port 62. When in its closed position, the ball is seated in its valve seat to prevent fluid flow through the channel 88. The ball is biased to its closed position by a small compression spring 118 and by the force of fluid delivered from the inlet port through the channel 88.

Because the reset valve 20 is formed within the valve body 12 with the other valve components, the pressure reducing valve 16 can be reset without a separately mounted reset valve. Moreover, because the reset valve is positioned within the confines of the cup-shaped member 82, the overall space requirements of the valve assembly are further reduced to enhance the compactness of the valve assembly.

To prevent leakage between the valves 16,18,20, O-rings or other seals 120,121,122 are positioned between the valve seat 106 of the pressure relief valve 18 and the stem 78 of the pressure reducing valve 16, in the cutout section 84 of the stem, and between the valve seat 112 of the reset valve 20 and the inner wall of the cup-shaped member 82 of the pressure reducing valve, respectively.

In use, the valve assembly 10 and its corresponding base 58 are interposed in a hydraulic circuit that requires fluid pressure at a reduced pressure level. For example, the inlet port 62 may be coupled with a high pressure line that is connected to a source of high pressure fluid such as a pump and the outlet port 66 may be coupled with a low pressure line that is connected to a device such as a clamp that requires operating fluid at a lower fluid pressure than the fluid pressure delivered by the pump.

When fluid is first delivered to the inlet port 62, the valve assembly 10 is initially in the state illustrated in FIG. 4. Specifically, the large compression spring 90 biases the pressure reducing valve 16 to its open position to permit fluid flow from the inlet port to the outlet port and biases the pressure relief valve 18 to its closed position to prevent fluid flow out of the vent port 38. Similarly, the smaller compression spring 118 and the fluid flowing into the inlet port through the channel 88 biases the reset valve 20 to its closed position.

When the pressure of the fluid in the low pressure line reaches a pre-selected operating level, the valve assembly 10 shifts to the state illustrated in FIG. 5. Specifically, the fluid within the enlarged lower bore 46 of the lower body section 24 pushes the pressure reducing valve 16 upward to its closed position against the force of the compression spring 90. The pressure relief valve 18 and reset valve 20 remain closed at this time. These conditions set the fluid pressure in the low pressure line to the desired operating level. The valve assembly automatically maintains the fluid pressure in the low pressure line at this desired operating level by opening the pressure reducing valve if the fluid pressure in the low pressure line drops below the pre-selected operating pressure level.

If the low pressure line experiences an over-pressure condition that causes the pressure at the outlet port 66 to rise above the pre-selected operating pressure level, which may be caused by heating of the fluid in the low pressure line or disturbances to the device or devices to which the low pressure line is attached, the valve assembly 10 shifts to the state illustrated in FIG. 6. Specifically, the processed fluid in the outlet port and enlarged lower bore 46 passes upwardly through the fluid channel 86 and lifts the ball valve 104 off its valve seat 106 against the force of the compression spring 90 to permit excess fluid in the low pressure line to vent out the vent port 38. When the pressure in the low pressure line drops back down to or below the pre-selected operating pressure level, the compression spring once again seats the ball 104 against its corresponding valve seat 106 to close the pressure relief valve.

Finally, if the pressure in the high pressure line drops below a pre-selected reset level, which may occur when the hydraulic pump or other source of fluid is turned off or closed, the pressure of the fluid in the fluid channel 88 also drops. This causes the fluid in the outlet port and within the cup-shaped member 82 of the pressure reducing valve 16 to lift the ball 110 of the reset valve 20 against the force of the compression spring 118 to open the reset valve. This permits the passage of fluid from the low pressure port to the high pressure port and therefore permits the compression spring 90 to shift the pressure reducing valve back to its open position as illustrated in FIG. 4.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A pressure reducing valve assembly for delivering fluid from a high pressure line to a low pressure line, the valve assembly comprising:

an elongated tubular body presenting a longitudinal axis and including a high pressure port for receiving fluid from the high pressure line, a low pressure port for delivering fluid to the low pressure line, and a relief port for venting fluid out of the body;

a pressure reducing valve positioned within the body for reducing the pressure of the fluid discharged from the low pressure port relative to the pressure of the fluid entering the high pressure port, the pressure reducing valve being shiftable within the body between an open position wherein the pressure reducing valve permits delivery of fluid from the high pressure port to the low pressure port when the pressure of the fluid in the low pressure line is below a pre-determined operating level and a closed position wherein the pressure reducing valve prevents fluid from passing from the high pressure port the to low pressure port when the pressure of the fluid in the low pressure line equals or exceeds the pre-determined operating level;

a pressure relief valve positioned within the body for permitting discharge of fluid out of the relief port when the pressure of the fluid in the low pressure line exceeds a pre-determined over-pressure level; and a reset valve positioned within the body for resetting the pressure reducing valve to the open position when the pressure of the fluid in the high pressure line drops below a pre-selected reset level;

the pressure reducing valve, pressure relief valve, and reset valve being mounted entirely within the body and spaced along the length of the body.

2. The valve assembly as set forth in claim 1, wherein the pressure reducing valve, pressure relief valve, and reset valve are coaxially aligned along the longitudinal axis of the body.

3. The valve assembly as set forth in claim 1, the pressure reducing valve being a poppet-type valve including an elongated stem, an enlarged valve head extending radially from the stem and a cup-shaped member depending from one end of the stem.

4. The valve assembly as set forth in claim 3, wherein the reset valve is positioned within the cup-shaped member of the pressure reducing valve.

5. The valve assembly as set forth in claim 4, the reset valve being a ball-type valve having a ball valve, a valve seat, and a spring for biasing the ball valve against the ball seat.

6. The valve assembly as set forth in claim 1, further including a compression spring for biasing the pressure reducing valve to the open position, wherein the pressure relief valve is sandwiched between the compression spring and the pressure reducing valve.

7. The valve assembly as set forth in claim 6, the pressure relief valve being a ball-type valve having a ball valve and a valve seat, and wherein the ball valve is biased against the ball seat by the compression spring that also biases the pressure reducing valve to the open position.

8. The valve assembly as set forth in claim 1, the body including threadably coupled upper and lower body sections.

9. The valve assembly as set forth in claim 1, further including a base having a recess in which the body is received, an inlet port in fluid communication with the high pressure port of the body, and an outlet port in fluid communication with the low pressure port of the body.

10. A pressure reducing valve assembly for delivering fluid from a high pressure line to a low pressure line, the valve assembly comprising:

an elongated tubular body presenting a longitudinal axis and including a high pressure port for receiving fluid from the high pressure line, a low pressure port for delivering fluid to the low pressure line, and a relief port for venting fluid out of the body;

a pressure reducing valve positioned within the body for reducing the pressure of the fluid discharged from the low pressure port relative to the pressure of the fluid entering the high pressure port, the pressure reducing valve being shiftable within the body between open and closed positions, the pressure reducing valve being a poppet-type valve including an elongated stem, an enlarged valve head extending radially from the stem and a cup-shaped member depending from one end of the stem;

a pressure relief valve positioned within the body for permitting discharge of fluid out of the relief port when the pressure of the fluid in the low pressure line exceeds a pre-determined over-pressure level; and a reset valve positioned within the body for resetting the pressure reducing valve to the open position when the pressure of the fluid in the high pressure line drops below a pre-selected reset level, the reset valve being positioned within the cup-shaped member of the pressure reducing valve.

11. The valve assembly as set forth in claim 10, the reset valve being a ball-type valve having a ball valve, a valve seat, and a spring for biasing the ball valve against the ball seat.

12. The valve assembly as set forth in claim 10, further including a compression spring for biasing the pressure reducing valve to the open position, wherein the pressure relief valve is sandwiched between the compression spring and the pressure reducing valve.

13. The valve assembly as set forth in claim 10, wherein the pressure reducing valve, pressure relief valve, and reset valve are coaxially aligned along the longitudinal axis of the body.

14. A pressure reducing valve assembly for delivering fluid from a high pressure line to a low pressure line, the valve assembly comprising:

an elongated tubular body presenting a longitudinal axis and including a high pressure port for receiving fluid from the high pressure line, a low pressure port for delivering fluid to the low pressure line, and a relief port for venting fluid out of the body;

a pressure reducing valve positioned within the body for reducing the pressure of the fluid discharged from the low pressure port relative to the pressure of the fluid entering the high pressure port, the pressure reducing valve being shiftable within the body between open and closed positions;

a compression spring for biasing the pressure reducing valve to the open position;

a pressure relief valve positioned within the body for permitting discharge of fluid out of the relief port when the pressure of the fluid in the low pressure line exceeds a pre-determined over-pressure level, the pressure relief valve being sandwiched between the compression spring and the pressure reducing valve; and a reset valve positioned within the body for resetting the pressure reducing valve to the open position when the pressure of the fluid in the high pressure line drops below a pre-selected reset level.

15. The valve assembly as set forth in claim 14, the pressure relief valve being a ball-type valve having a ball valve and a valve seat.

16. The valve assembly as set forth in claim 14, wherein the pressure reducing valve, pressure relief valve, and reset valve are coaxially aligned along the longitudinal axis of the body.

* * * * *